(12) United States Patent
Allais

(10) Patent No.: US 10,676,405 B2
(45) Date of Patent: Jun. 9, 2020

(54) PROCESS FOR PREPARING A SULPHUR-CONTAINING SOIL IMPROVER

(71) Applicant: SHELL OIL COMPANY, Houston, TX (US)

(72) Inventor: Cyrille Paul Allais, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 207 days.

(21) Appl. No.: 15/536,312

(22) PCT Filed: Dec. 18, 2015

(86) PCT No.: PCT/EP2015/080670
§ 371 (c)(1),
(2) Date: Jun. 15, 2017

(87) PCT Pub. No.: WO2016/097378
PCT Pub. Date: Jun. 23, 2016

(65) Prior Publication Data
US 2017/0327430 A1  Nov. 16, 2017

(30) Foreign Application Priority Data

Dec. 19, 2014  (EP) ..................................... 14199219

(51) Int. Cl.
| | | |
|---|---|---|
| *C05D 9/00* | (2006.01) | |
| *C09K 17/04* | (2006.01) | |
| *C05G 3/00* | (2020.01) | |
| *C05D 9/02* | (2006.01) | |

(52) U.S. Cl.
CPC ................. *C05D 9/00* (2013.01); *C05D 9/02* (2013.01); *C05G 3/00* (2013.01); *C05G 3/007* (2013.01); *C05G 3/0058* (2013.01); *C05G 3/0076* (2013.01)

(58) Field of Classification Search
CPC ....................................................... C05D 9/00
See application file for complete search history.

(56) References Cited

FOREIGN PATENT DOCUMENTS

WO     WO 2014/009326 A1 *   1/2014  ............... C05G 3/00

* cited by examiner

*Primary Examiner* — Wayne A Langel

(57) ABSTRACT

A process for preparing an elemental sulphur-containing composition for use as a fertilizer and/or soil improver comprises wet milling elemental sulphur in a liquid to produce a micronized sulphur slurry for application to soil, and further comprises adding a preventive scavenging additive for fixating sulphur dioxide and hydrogen sulphide gases that are released downstream of the mill.

10 Claims, 1 Drawing Sheet

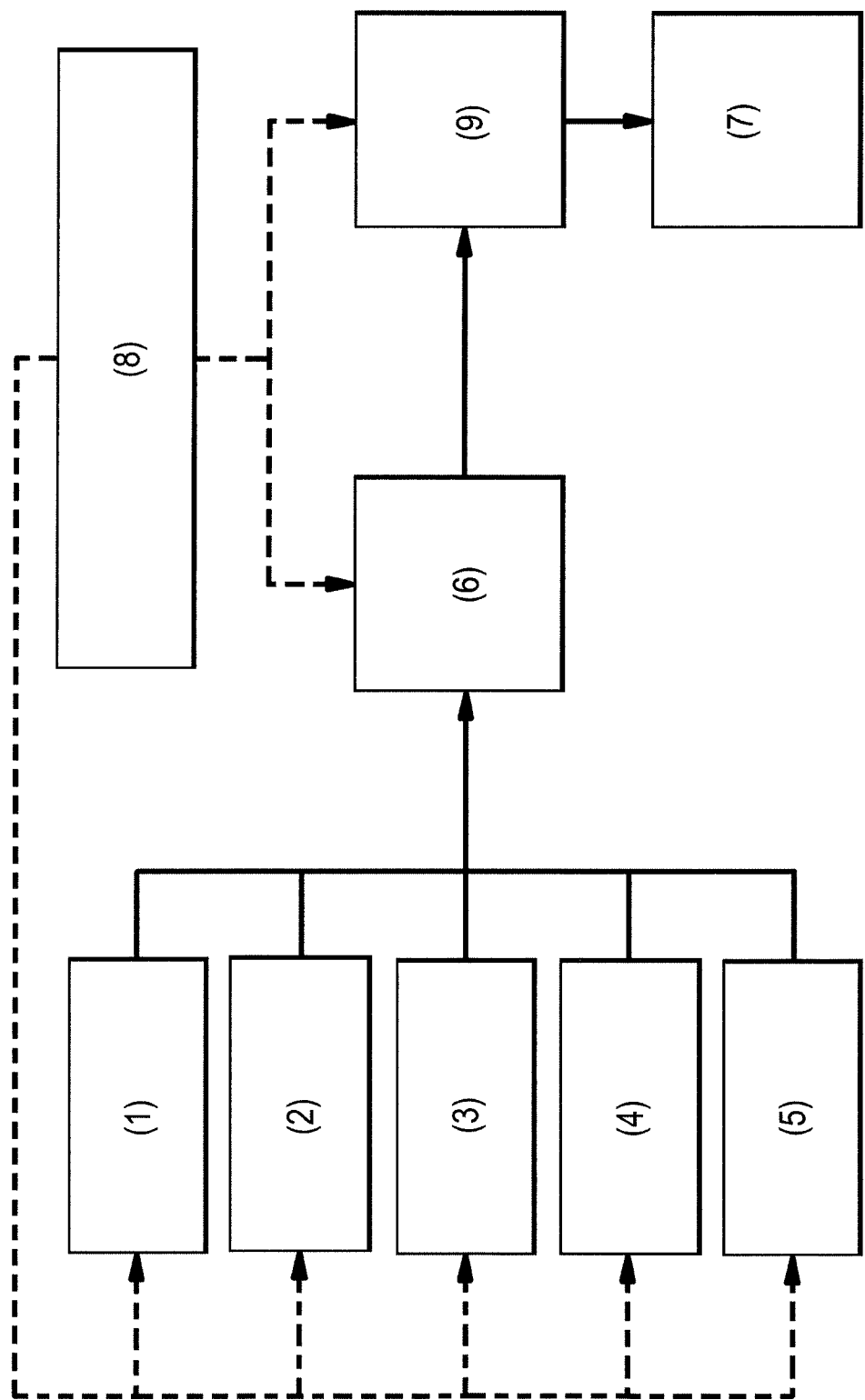

PROCESS FOR PREPARING A SULPHUR-CONTAINING SOIL IMPROVER

PRIORITY CLAIM

The present application is the National Stage (§ 371) of International Application No. PCT/EP2015/080670, filed Dec. 18, 2015, which claims priority form European Patent Application No. 14199219.8, filed Dec. 19, 2014 incorporated herein by reference.

FIELD OF THE INVENTION

The present invention provides a process for the preparation of sulphur-containing compositions that are commonly used as fertilisers and/or soil improvers.

BACKGROUND OF THE INVENTION

Sulphur is regarded as an essential nutrient for plant growth therefore low crop yields and poor quality crops may often be attributed to deficiencies in sulphur levels in the soil.

Separately, some soils, such as alkaline soils, sodic soils, or sodic alkaline soils, have characteristics that make them unsuited or sub optimal for agriculture. Correcting the pH of such soils and/or restoring the ionic imbalance in the soil, and/or correcting both the pH and the ionic imbalance of the soil can restore the suitability of soils for agricultural use.

Accordingly, the use of sulphur-based fertilizers and soil improvers has been required in order to restore the soils for agricultural use.

Generally the nutrient value of sulphur and its acidifying characteristics is dependent upon it being in the form of sulphates, but a disadvantage of sulphates if applied directly is that they are mobile in the soil and easily leach out of the root zone, effectively making the sulphate nutrient unavailable to the plants.

Elemental sulphur is known for use as a fertilizer or soil improver and is advantageous in that it is able to remain in the soil over extended periods gradually being degraded by soil bacteria into the plant-usable sulphate form. In this way, elemental sulphur can be regarded as a slow (timed) release form of plant nutrient that is less prone to leaching from the root zone. Elemental sulphur also offers further benefits in that it may also act as a fungicide against certain microorganisms, as a pesticide against certain soil and plant pests, and assists in the decomposition of plant residues. A particular benefit is that it may also improve phosphorus and nitrogen nutrient utilization in alkaline and calcareous soils.

Application of elemental sulphur is not without problems, however, as to be readily degradable in the soil it should be utilized in finely divided form. As will be appreciated, finely divided sulphur presents an explosive hazard and may release toxic gaseous impurities.

Elemental sulphur dispersions can be produced by mixing dry sulphur powder, such as milled sulphur or flowers of sulphur, in a dispersion medium, or by dispersing pre-aggregated sulphur particles in a dispersion medium. In each case, the preparation, transport and handling of free flowing or agglomerated sulphur powder presents a safety risk.

It is also known that finely divided elemental sulphur particles can be released from formed elemental sulphur products that contain swelling agents. The agronomic efficiency of such products relies upon the interaction between moisture and the swelling agent; the moisture causing the swelling agent to grow in size resulting in the product breaking down into sulphur particles of various sizes. Such a technique involves the particle size of sulphur to be typically one order of magnitude larger than that of sulphur prepared by milling techniques and hence the sulphur is less agronomically efficient. Moreover, the product is highly hygroscopic and hence requires special care for handling, transportation, storage and application in order to avoid breaking up of the material and the formation of explosible sulphur dust.

Wet milling techniques in the presence of additives are also known for preparation of sulphur suspensions but these products too have drawbacks in that when stored in closed containers they are prone to gradual release of amounts of chemicals dissolved or chemically bound to sulphur such as hydrogen sulphide and sulphur dioxide. Slow release of such gases can occur even when degassed sulphur, generally known to contain <10 ppm hydrogen sulphide, is used as the sulphur source. The concentration of these noxious gases increases over time when stored thus placing users at risk. While it is possible to achieve adequate fixation of suspensions containing hydrogen sulphide and sulphur dioxide, in doing so handling of these gases is required, hence there is still a risk of exposing personnel to the noxious gases. Moreover, it requires the involvement of a separate processing step during handling, transport, or application of the suspension, none of which is desirable.

Accordingly, there remains a need for an improved process for preparing sulphur-based compositions for application as fertilizers and/or soil improvers. In particular, the present invention seeks to provide a safe and efficient method of producing finely divided sulphur compositions which are convenient and non-hazardous to handle, transport and apply.

SUMMARY OF THE INVENTION

From a first aspect, the invention provides a process for preparing an elemental sulphur-containing composition for use as a fertilizer and/or soil improver, the process comprising wet milling elemental sulphur in a liquid to produce a micronized sulphur slurry for application to soil, wherein the process further comprises adding a preventive scavenging additive for fixating sulphur dioxide and hydrogen sulphide gases that are released by the slurry downstream of the mill, wherein the preventive scavenging additive is added prior to or during application of the slurry to the soil. By means of the present invention an end-to-end safe production process is achieved, with explosion hazards avoided by use of the wet milling technique and downstream exposure issues associated with the release of dangerous gases from the sulphur composition also eliminated. As well as being safely manufactured, the resulting slurry can be stored, transported and applied to the soil whilst minimizing or preventing the aforementioned risks.

The slurry produced according to the present invention may be applied directly to the soil, for example, using slurry/manure applications systems, or may be applied by dosing the slurry into irrigation water and applied through irrigation systems.

The preventive scavenging additive may be introduced into the mill concomitantly with the addition of elemental sulphur or separately therefrom, either prior to, during or after the wet milling of the sulphur.

Preferably, the preventive scavenging additive is added in an amount sufficient to trap hydrogen sulphide and sulphur dioxide impurities that may be released from the slurry over time, for example, throughout the period from manufacture to handling, storage, transportation and application of the slurry.

The potential exposure to high concentrations of gases released from solids in which their concentration in weight percentage is low is not well understood. However, the applicant has appreciated that the safety risk resides in the transfer of trapped gases within a solid to free gas in a liquid and/or a gas, in which its volume is greatly increased. Hence, if the trapped gas is transferred in a large volume of air, the potential exposure may remain low, but in the event the trapped gas is transferred to a small volume of air, such as the gas cap of a storage or transport container, the potential exposure may be undesirably and dangerously high.

In theory, elemental sulphur containing 5 ppm hydrogen sulphide, assuming no additional hydrogen sulphide is produced during processing, could release 5 mg hydrogen sulphide per kilogram. If such sulphur is wet milled in a liquid whereby the sulphur concentration in the final slurry is 50 wt %, and the slurry is stored in drums that are 90% filled, then the potential exposure to dangerous gases is different. For a 100 litre drum filled with 90 litre slurry containing circa 67.5 kg sulphur (assuming a suspension density of 1.5 kg/l), the maximum amount of hydrogen sulphide that could be released in the 5 l gas cap is 340 mg (68 kg×5 mg/kg), or 10.0 mmol (0.340 g/34 g·mol$^{-1}$×1000) which is equivalent, under normal conditions of temperature and pressure (293.15 Kelvin, 101325 atm) to 0.24 litre of hydrogen sulphide gas in a 5 litre gas cap, equivalent to >48,000 ppm, or >4.8% vol in the gas cap, which is well above generally accepted limits for safe handling of hydrogen sulphide containing gases. In practice, the rate and extent of hydrogen sulphide emissions from a dispersion mill used to wet mill elemental sulphur can vary widely, but are generally low; the transfer of dissolved gases from the sulphur is not quantitative and is time dependent. Further, wet milling involves the presence of a liquid phase in which gases can also be dissolved and subsequently released therefrom.

For example, while preparing a batch of micronized elemental sulphur in a high shear dispersion mill, regular checks with calibrated, portable hydrogen sulphide monitors indicated hydrogen sulphide values in the region of 4 ppm in the vicinity just above the mill and 0-1 ppm in the surrounding area of the mill. These values suggest that significant degassing of sulphur does not occur during milling, but substantial degassing may take place subsequently when the slurry is handled or stored.

Redispersion tests were carried out on 50 wt % sulphur slurries prepared in a dispersion mill (manufactured by Kady International, model OC-30, stainless steel, cooling jacketed, 20-60 gallons working capacity, equipped with a 30 HP Drive and a variable frequency controller) and stored in circa 95% full 30 gallon drum for a couple days. Gas monitors were used to detect if further degassing had occurred in the drums and during recirculation. The slurry was recirculated by means of a drum pump to check its homogeneity. In these tests, typically, low levels of hydrogen sulphide (5-10 ppm) and sulphur dioxide (0-5 ppm) were detected in the gas cap of the drum prior to the start of recirculation, but as recirculation commenced some higher "spot" levels were observed. For example, spot measurements in the region of 80 ppm hydrogen sulphide were made adjacent the discharge of the recirculation line, and process area hydrogen sulphide concentration increased to ca 5 ppm but decreased rapidly to 0 ppm when recirculation was stopped. These measurements confirm that some levels of dissolved gases were transferred to the liquid phase of the slurry and that these gases were readily released during the handling of the slurries.

These observations also show that despite a low risk of exposure to dangerous concentrations of toxic gases when manufacturing an elemental sulphur composition, a significant exposure risk may remain when handling an aged elemental sulphur composition.

Accordingly, by means of the invention wherein a preventive scavenging additive is included with the wet milled elemental sulphur, it is possible to prevent or minimize the exposure to hydrogen sulphide and sulphur dioxide from the resulting sulphur composition for a significant period of time and most preferably until its application to soils.

Based upon the above observations, it is possible to determine a suitable amount of preventive scavenging additive to add to the elemental sulphur slurry in the process according to the invention. It will be appreciated that the amount of preventive scavenging additive required to fixate sulphur dioxide and hydrogen sulphide gases depends on the additive or additives used. The term "preventive scavenging additive" as used herein is intended to embrace a single additive or a mixture of additives, each component thereof contributing to the gas fixation. In a preferred process, the preventive scavenging additive is introduced in an amount up to and including 5 wt. %, preferably from 0.01, especially from 0.05, for example from 0.1, to 2 wt. %, based upon the total weight of the slurry.

In the process according to the invention, the preventive scavenging additive preferably includes one or more compounds selected from the following groups:
 (a) bases, for chemically reacting with and trapping acids; and
 (b) complexing agents, for forming metal complexes with gaseous impurities.

The preventive scavenging additive preferably comprises a basic material, for example, caustic lime (calcium oxide), caustic potash (potassium hydroxide), caustic soda (sodium hydroxide), aqua ammonia (ammonium hydroxide), a carbamide, or an amine. Such bases are advantageous as not only can they scrub hydrogen sulphide and/or sulphur dioxide, they also help minimize or at least reduce the activity during handling and transportation of sulphur oxidizing bacteria, such as *Thiobacillus*, which are generally active in an acidic environment but are not active, or only moderately active, in a basic environment. Thus by means of such basic preventive scavenging additives, sulphur oxidation is effectively prevented in the drums where the sulphur slurry is stored.

Preferably the preventive scavenging additive basic material is added to the elemental sulphur in an amount to maintain the pH of the sulphur slurry within the range of pH 9 to 13.

Use of caustic lime as a preventive scavenging additive is particularly preferred if usage of the slurry for sodic soil remediation is envisaged, since caustic lime will supply calcium ions to the soil alongside sulphur when the slurry is applied, thereby further improving efficiency of sodicity control.

Indeed, it is desirable that the preventive scavenging additive comprises a nutrient and/or soil amendment for improving the soil to be treated with the sulphur slurry. Such preventive scavenging additives include, but are not limited to, KOH, K$_2$O, NH$_4$OH, CaO and Ca(OH)$_2$. When the slurry is to be used for amelioration of sodic alkaline soils, it is preferred that the preventive scavenging additive is calcium-based since superior amelioration is to be expected.

Complexing agents may be used as an alternative preventive scavenging additive instead of basic materials or in addition thereto. Such complexing agents react with dissolved gaseous impurities, hence trapping them. For example, $M^{II}$ salts of transition metals like zinc and copper can bind with hydrogen sulphides to produce stable metal sulphides such as copper or zinc sulphide. Preferably, the concentration of the complexing agent, used alone or in conjunction with one or more basic materials, is between 0.01 and 1 g Metal per Kilogram Elemental Sulphur.

As will be appreciated, other additives may be incorporated in the slurry, for example by addition during or at the end of the milling process, or once the sulphur slurry has been transferred to a slurry tank for storage or transportation. Preferably one or more further agents are added to the mill during preparation of the sulphur slurry.

If present, such other additives are typically added in amounts in the range of from 0.001 to 5 wt. % based upon the total weight of the slurry.

For example, the elemental sulphur may be wet milled with one or more stabilizing agents. Addition of a stabilizing or thickening agent enables the resulting slurry to be stored for a period of time, for example for periods of 1 to 3 months, without requiring redispersion. Suitable thickening agents include, for example, xantham gum and agar; clays, such as bentonite clay, especially sodium bentonite clay, or attapulgite clays, preferably of the swelling type; and polymers such as polyethylene glycol.

When bentonite clays are added, it is especially preferred to use pre-wetted bentonite. Use of dry bentonite may give rise to floating lumps on the surface of the slurry. Further, it is preferred to add bentonite towards the end of the micronization process.

Preferably, the stabilizing agent is added in an amount from 0.1 to 5 weight percent based on the total weight of the slurry.

Alternatively, or in addition thereto, the process of the invention may take place in the presence of a milling aid. For example, the elemental sulphur may be wet milled in the presence of a viscosity modifier. Addition of a viscosity modifier can increase the efficiency of the milling operation by substantially preventing any drastic increase in viscosity of the sulphur slurry during the milling cycle.

The viscosity modifier may be added to the liquid before the elemental sulphur is wet milled, or may be added to the dispersion of milled elemental sulphur before or during the combination with other components.

Preferably the viscosity modifier comprises one or more surfactants, especially an anionic surfactant, such as a lignosulphonate. Calcium lignosulphonate and/or zinc lignosulphonate are especially preferred.

Typically, the viscosity modifier is added in such an amount that the sulphur slurry comprises from 0.001 to 5.0 wt. % modifier, preferably from 0.1 to 1.5 wt. %, based on the total weight of the slurry.

Other ingredients may additionally be incorporated into the sulphur slurry of the present invention in order to tailor the fertilizer composition to its intended end-use. Suitably a nutrient and/or soil amendment is added to the sulphur slurry. Examples include plant micronutrients such as boron, selenium, sodium, zinc, manganese, iron, copper, molybdenum, cobalt, calcium, magnesium and combinations thereof. These nutrients may be supplied in elemental form or in the form of salts, for examples as sulphates, nitrates, oxides or halides. In this way, slurries enriched in plant nutrients are obtained. The amount of plant micronutrients introduced depends on the type of fertilizer needed and is typically in the range of from 0.1 to 5 wt. %, based on the total weight of the slurry.

Optionally, the preventive scavenging additive may be compounded, such as by blending, with one or more of the above stabilizing agents, viscosity modifiers, and any other ingredient in the slurry preparation.

The elemental sulphur used in the process of the present invention may be obtained from any suitable source; for example, obtained from an industrial process, such as in the removal of unwanted sulphur components from natural gas. The elemental sulphur may be of high purity, as would be obtained via the Claus process (typically >99.9% S), or of significantly lower purity, such as in the form of sulphur filter cake obtained from sulphur melting and filtration operations and sulphur obtained from various chemical and biological hydrogen sulphide gas removal processes. Typically, such sulphur sources may contain between about 30 to 99.0 wt. %, preferably from 50 to 99.5 wt. %, more preferably from 60 to 99.9 wt. %, sulphur.

Sulphur may be added to the dispersion mill as molten sulphur or as solid sulphur. Addition as solid sulphur is advantageous in that it avoids the requirement to maintain the sulphur at a high temperature (sulphur is molten above 120° C.). The sulphur may be added as pastilles, prills or pellets, for example, rotoformed pellets of average size from 3 to 4 mm.

The liquid in which the sulphur is dispersed is preferably water, but may alternatively be an aqueous liquid, such as an aqueous solution or suspension, optionally comprising nutrients such as liquid fertilizer solutions and suspensions. In one embodiment, for example, the elemental sulphur may be wet milled in a liquid, such as an aqueous solution, comprising a urea-ammonium nitrate solution (UAN) as the liquid carrier, together with the preventive scavenging additive. Use of UAN in the process of the invention increases the pH of the composition and produces a nitrogen-sulphur liquid fertilizer especially suitable for application to the soil by irrigation.

The amount of elemental sulphur in the resulting slurry is preferably from 10 to 90 wt. %, more preferably from 20 to 80 wt. %, most preferably from 30 to 70 wt. % based upon the total weight of the slurry.

Taking account of the preventive scavenging additive and other optional components, the balance of the slurry composition preferably comprises water, more preferably the slurry composition comprises at least 20 wt. % water based upon the total weight of the slurry.

The process according to the invention can be achieved with any suitable milling equipment, and is preferably performed in a high shear dispersion mill, especially of the type in which a rotor turns within a slotted stator, thus facilitating the selection and control (or management) of the size and size distribution of the sulphur particles in the slurry. The actual size and size distribution of the sulphur particles within the slurry may be selected, for example, according to the agricultural environment for which the slurry fertilizer is intended, such as in relation to the local soil and/or climatic conditions.

Advantageously, the operating conditions for the dispersing mill are selected to produce a sulphur slurry in which 100% of the sulphur particles are smaller than 500 μm, more preferably with >50% of the particles being smaller than 53 μm, most preferably with >60% being smaller than 53 μm. Operating parameters may also be varied also according to the desired sulphur content and thickness of the slurry. In this regard, the dispersing mill itself as used in the process may be selected to suit the particular properties of the slurry to be produced.

From a second aspect, the invention resides in the use of a preventive scavenging additive to fixate sulphur dioxide and hydrogen sulphide gases in a sulphur slurry soil fertilizer, wherein the additive is combined with elemental sulphur in a wet milling process.

From another aspect, the invention resides in the use of a sulphur slurry, when prepared by the process according to the first aspect of the invention, as a soil fertilizer for direct application to the soil using a slurry/manure application system or any other relevant application method, or for dosing into irrigation water and applying to the soil through an irrigation system.

From yet another aspect, the invention resides in a soil fertilizer comprising a micronized sulphur slurry obtained by wet milling elemental sulphur, wherein the fertilizer further comprises a preventive scavenging additive for fixating sulphur dioxide and hydrogen sulphide gases in the slurry to avoid exposure of personnel to toxic levels of said gases during storage and handling of the slurry. The amounts of the sulphur, preventive scavenging additive and any optional components are as hereinbefore described with regard to the first aspect of the invention.

BRIEF DESCRIPTION OF THE DRAWINGS

The invention is further illustrated by reference to the following drawing in which:

FIG. 1 shows a process block diagram of a process according to the present invention.

DETAILED DESCRIPTION OF THE INVENTION

FIG. 1 illustrates a process for preparing a sulphur slurry according to the present invention. In the process exemplified, separate feeds of the slurry components are provided, namely the aqueous solution (1), the elemental sulphur solid (2), the preventive scavenging additive (3), the viscosity modifier (4) and the thickening agent (5). Any of these components (1) to (5) can be fed separately to the wet milling device (6), prior to commencement of or during milling. Alternatively, some or all of the components (1) to (5) may be combined, such as by blending, prior to feeding to the milling device. Provision is also made to enable the components (3) to (5) to be fed to the micronized sulphur slurry once it has been transferred from the milling device (6) for storage.

Macro or micro nutrient (8) may optionally be fed at any stage, as shown by dashed lines, for example to the wet milling device or to the micronized slurry after discharge from the milling device for storage (9). Thereafter, the sulphur slurry may be conveyed (7) for application as a soil improver either directly to the soil or following dilution and application by irrigation.

It will be appreciated by the skilled person that various modifications, combinations, substitutions and alterations can be made to the process described above without deviating from the invention as described herein, or from the scope of the claims that follow. For example, the output from the mill may be directed to separate storage tanks so that the mill can be configured to give different slurry output in terms of particle size, particle grade, capacity or other mixing parameters. This affords a level of additional flexibility to the process that enables a plurality of separate and discrete product lines to be derived from a single common feedstream.

It will be appreciated that the process of the present invention further provides for combined arrangements in which the elemental sulphur is wet milled in dispersion mills that are arranged in series, in parallel; or in series and in parallel. In so doing, the level of control over resulting slurry product can be optimized.

The present invention will be further illustrated by the following Examples:

EXAMPLES 1 to 4

Exploratory tests were conducted in a Kady L-2000, model OC-30, high dispersion mill, to mill elemental sulphur (ES) pastilles. For the tests, the milling media was water. Various additives were tested as stabilizers. The additives tested were a 50% sodium hydroxide solution, calcium lignosulphonate solution, zinc oxide and xanthan gum. The sodium hydroxide, zinc oxide and calcium lignosulphonate additives were each added to the water milling medium prior to the addition of the ES pastilles. For all tests however, the xanthan gum solution was added to the milling vessel after completion of the milling time.

The raw materials required for each test were weighed using a mechanical balance. In the case of the xanthan gum, the gum was premixed with water to obtain a 20% solution.

Each test, consisting of 2.5 L batches, was conducted by filling the milling vessel with a predetermined amount of water. The VFD (Variable Frequency Drive) was turned on and the frequency (hertz) was increased to achieve a uniform flow pattern. Once the desired flow pattern was obtained, the manual addition of ES pastilles was started and wet milling was carried out.

The tables below contain the test details (Table 1) and the results (Tables 2 to 6).

TABLE 1

| | Example 1 | Example 2 | Example 3 | Example 4 |
|---|---|---|---|---|
| Component as a percentage based on total weight of slurry | | | | |
| Calculated Elemental Sulphur Content, % | 50 | 50 | 50 | 50 |
| Calculated calcium lignosulphonate Content (Dry Basis), % | 0.10 | 0.10 | 0.10 | 0.10 |
| Calculated Xanthan Gum Content, % | 0.25 | 0.25 | 0.25 | 0.25 |
| Calculated Xanthan Gum Solution, % | 20 | 20 | 20 | 20 |
| Calculated Sodium Hydroxide Content (Dry Basis), % | — | 0.10 | — | 0.10 |
| Calculated Zinc Oxide Content, % | — | — | 0.05 | 0.05 |
| Mill OC-30: Operating Conditions | | | | |
| Milling Time, min | 4 | 4 | 4 | 4 |
| Energy Input, kWh/mt ES | 56.2 | 53.7 | 39.9 | 50.8 |

The contents of each test sample were then transferred quantitatively in four separated one gallon plastic buckets that were closed hermetically with a plastic lid fitted with a rubber stopper. This set-up enabled gas measurements to be performed on the gas cap of all the containers. $H_2S$ detection tests were conducted on the four samples. For H₂S detection, a BUVECO Micro BUTOX 500 (MB), a BW Technologies by Honeywell (BW), and a Draeger X-am 5100 (DX) were used, and for SO₂ a BUVECO Gas Alert Micro 5 multiple gas detector (M5) was used. Each test sample was shaken for 10 seconds, the stopper was removed and then the gas detector was placed on top of the opening for 10 seconds before a reading was made. On some occasions, a second meter was used to confirm findings.

TABLE 2

Results After 6 Days

|  | Example 1 | Example 2 | Example 3 | Example 4 |
|---|---|---|---|---|
| SO₂ (M5) | Not measured | Not measured | Not measured | Not measured |
| H₂S (MB) | 23-73 ppm | 0 ppm | 0 ppm | 0 ppm |

TABLE 3

Results After 9 Days

|  | Example 1 | Example 2 | Example 3 | Example 4 |
|---|---|---|---|---|
| SO₂ (M5) | Not measured | Not measured | Not measured | Not measured |
| H₂S (MB) | 70 ppm - Off limit | 0 ppm | 0 ppm | 0 ppm |

TABLE 4

Results After 13 Days

|  | Example 1 | Example 2 | Example 3 | Example 4 |
|---|---|---|---|---|
| SO₂ (M5) | 38 ppm/Off limit | 0 ppm | 0 ppm | 1 ppm |
| H₂S (MB) | 70 ppm - Off limit | 0 ppm | 0 ppm | 0 ppm |
| H₂S (DX) | 138 ppm/Off limit | 0 ppm | 0 ppm | 1 ppm |

TABLE 5

Results After 8 Weeks

|  | Example 1 | Example 2 | Example 3 | Example 4 |
|---|---|---|---|---|
| H₂S (BW) | 100 ppm/Off limit | 100 ppm/Off limit | 0 ppm | 100 ppm/Off limit |

After these tests, 2.2 g of Zinc oxide were added to the slurry of Example 1, and an additional 7.7 g sodium hydroxide in solution form, were added to the slurries of Examples 2 and 4 respectively, the plastic buckets stirred, and allowed to sit for one hour. They were then tested and the results given in Table 6 below.

TABLE 6

|  | Example 1 | Example 2 | Example 3 | Example 4 |
|---|---|---|---|---|
| H₂S (BW) | 100 ppm/Off limit | 0 ppm | 0 ppm | 0 ppm |

The results show the significant action of the preventive scavenging additive to reduce toxic gases. It is believed that in respect of Example 3 the addition of the zinc oxide such that it was present during the wet milling phase meant that the powder became well dispersed through the slurry during milling and was able to fixate the toxic gases as they formed, or as they were released, during storage. In respect of Example 1 where zinc oxide has been added to an aged slurry, it is believed that the apparent lack of reduction of hydrogen sulphide is because dispersion was more difficult to achieve in the short time allowed, and it would take longer for a significant reduction effect to be achieved. Examples 2 and 4 show that addition of additives in solution form provides a significant effect to reduce the hydrogen sulphide gas, presumably through the increased short term dispersion possible through the slurry.

The invention claimed is:

1. A process for preparing an elemental sulphur-containing composition for use as a fertilizer and/or soil improver, the process comprising:
    wet milling elemental sulphur in a liquid to produce a micronized sulphur slurry for application to soil,
    adding a preventive scavenging additive that comprises a basic material for fixating sulphur dioxide and hydrogen sulphide gases that are released by the sulphur slurry downstream of a mill, wherein the preventive scavenging additive is added prior to or during application of the sulphur slurry to the soil, and
    wherein the preventive scavenging additive is added to the elemental sulphur in an amount to maintain the pH of the sulphur slurry within the range of from pH 9 to 13.

2. The process of claim 1, wherein the basic material is selected from the group consisting of: caustic lime (calcium oxide), caustic potash (potassium hydroxide), caustic soda (sodium hydroxide), aqua ammonia (ammonium hydroxide), a carbamide, an amine, and any combination thereof.

3. The process according to claim 1, wherein the preventive scavenging additive is used in an amount up to and including 5 wt. %, based upon the total weight of the sulphur slurry.

4. The process of claim 1, wherein the preventive scavenging additive is added to the liquid and wet milled with the sulphur slurry.

5. The process of claim 1, further comprising adding a lignosulphonate as a viscosity modifier in an amount that the sulphur slurry comprises from 0.001 to 5.0 wt. % modifier based on the total weight of the sulphur slurry.

6. The process of claim 1, further comprising adding a stabilizing agent comprising one or more members selected from the group consisting of: xantham gum, agar, clays, and polymers, wherein the stabilizing agent is added in an amount such that the sulphur slurry comprises from 0.1 to 5 wt. % of the agent based on the total weight of the sulphur slurry.

7. The process according to claim 1, wherein the elemental sulphur is added to the mill in an amount to produce the sulphur slurry, and wherein the amount of elemental sulphur added to the sulphur slurry comprises from 10 to 90 wt. % elemental sulphur based upon the total weight of the sulphur slurry.

8. The process according to claim 1, wherein the liquid is water or is an aqueous solution or suspension.

9. A fertilizer composition comprising a preventive scavenging additive obtained by the process of claim 1, wherein the preventive scavenging additive comprises a basic material for fixating sulphur dioxide and hydrogen sulphide gases, and wherein the preventive scavenging additive is added to the elemental sulphur of claim 1 in an amount to maintain a pH of a sulphur slurry within the range of from pH 9 to 13.

10. A soil fertilizer comprising a micronized sulphur slurry obtained by wet milling elemental sulphur in a liquid, wherein the fertilizer further comprises a preventive scavenging additive that comprises a basic material for fixating sulphur dioxide and hydrogen sulphide gases in the sulphur slurry to avoid exposure of personnel to toxic levels of said gases during storage and handling of the sulphur slurry, and wherein the preventative scavenging additive is added to the elemental sulphur in an amount to maintain the pH of the sulphur slurry within the range of from pH 9 to 13.

* * * * *